US 8,010,462 B2

(12) United States Patent
Kinory et al.

(10) Patent No.: US 8,010,462 B2
(45) Date of Patent: Aug. 30, 2011

(54) SYSTEM FOR DELIVERY AND RECEIPT OF DISPATCHES ESPECIALLY USEFUL FOR E-COMMERCE

(75) Inventors: Nir Kinory, Even Yehuda (IL); Yoav Koster, Haifa (IL)

(73) Assignee: Siemens Aktiengesellschaft, Munich (DE)

( * ) Notice: Subject to any disclaimer, the term of this patent is extended or adjusted under 35 U.S.C. 154(b) by 937 days.

(21) Appl. No.: 11/786,838

(22) Filed: Apr. 13, 2007

(65) Prior Publication Data
US 2007/0198290 A1    Aug. 23, 2007

Related U.S. Application Data

(62) Division of application No. 09/794,410, filed on Feb. 28, 2001, now abandoned.

(30) Foreign Application Priority Data

Mar. 1, 2000    (IL) .......................................... 134828

(51) Int. Cl.
G06Q 30/00    (2006.01)
(52) U.S. Cl. ........................................................ 705/339
(58) Field of Classification Search .................... 705/339
See application file for complete search history.

(56) References Cited

U.S. PATENT DOCUMENTS

| 4,894,717 | A | * | 1/1990 | Komei | 348/150 |
| 5,552,989 | A | * | 9/1996 | Bertrand | 701/200 |
| 5,701,252 | A | | 12/1997 | Facchin et al. | |
| 6,085,170 | A | * | 7/2000 | Tsukuda | 705/26 |
| 6,148,291 | A | * | 11/2000 | Radican | 705/28 |
| 6,344,796 | B1 | * | 2/2002 | Ogilvie et al. | 340/568.1 |
| 6,570,488 | B2 | * | 5/2003 | Kucharczyk et al. | 340/5.2 |
| 7,020,623 | B1 | * | 3/2006 | Tiley et al. | 705/26 |

(Continued)

FOREIGN PATENT DOCUMENTS
FR    2117113 A5    7/1972
(Continued)

OTHER PUBLICATIONS

Fitzpatrick, Michele, "Post-Holiday Returns May Test Online Retailers, Analysts Speculate", Knight-Ridder Tribune Business News, Jan. 4, 2000.*

(Continued)

Primary Examiner — John W Hayes
Assistant Examiner — Kevin Flynn
(74) Attorney, Agent, or Firm — Laurence A. Greenberg; Werner H. Stemer; Ralph E. Locher

(57) ABSTRACT

A last mile delivery system (LAMIS system) for delivery of parcels to recipients includes Automatic Delivery Machines (ADMs) that are located in public places. Each ADM has a local computer and data and communication network connection, and a set of cells for storing parcels, and a single access mechanism for each such set adapted to provide a recipient with access to a parcel stored in a cell while preventing access to parcels in other cells. Control centers use an ADM database with locations of the ADMs, a LAMIS server computer program for handling the data associated with the operation of the system. The control center has data and communication network connecting the LAMIS server with the local computers of the ADMs. The local computers are adapted to identify the recipient and to provide access to the parcel in the cell of the chosen ADM.

16 Claims, 9 Drawing Sheets

U.S. PATENT DOCUMENTS 7,653,603 B1 * 1/2010 Holtkamp et al. ............... 705/72
2001/0042024 A1 * 11/2001 Rogers ........................... 705/26

FOREIGN PATENT DOCUMENTS

| FR | 2 643 479 A | 8/1990 |
|----|-------------|--------|
| GB | 1 531 028 A | 11/1978 |
| GB | 2 302 976 A | 2/1997 |
| JP | 10 117 917 A | 5/1998 |
| JP | 11219476 A | 8/1999 |

OTHER PUBLICATIONS

Derwent Abstract—FR 2 643 479 A; Aug. 24, 1990; Normand Jean, France.

* cited by examiner

SYSTEM FOR DELIVERY AND RECEIPT OF DISPATCHES ESPECIALLY USEFUL FOR E-COMMERCE

CROSS REFERENCE TO RELATED APPLICATIONS

The present application is a divisional application of U.S. patent application Ser. No. 09/794,410, filed on Feb. 28, 2001, which claims priority to Israeli patent application no. 134828, filed on Mar. 1, 2000, which are herein incorporated by reference.

BACKGROUND OF THE INVENTION

This invention relates to systems for shipping and delivery of parcels and like items to and from residential and business areas, in particular to systems suitable for e-commerce.

Today, delivery of parcels to individual recipients is performed by state-run Post Office service and by numerous private courier agencies like DHL, In-Time, Royal Mail, United Parcels Service, FedEx, etc. Also, large commercial store chains maintain courier deliveries of their own.

A typical routine for a sender to send a parcel from post-office A to a recipient located near post-office B involves:
the sender visiting post office A and submitting a parcel and the recipient's identification data and geographical address;
the post office A shipping the parcel and necessary data to the post office B, usually through 2 or more hubs concentrating the flow of parcels, and using services of land/sea/air shipping companies;
the post office B delivering the parcel to the recipient by either a post person to the recipient's door, or more often notifying the recipient by mail or phone, and the recipient visiting the post office B to pick up the parcel.

Upon the delivery of the parcel, the post office B checks the identity of the recipient against the data accompanying the parcel, and, in some cases, effects a payment from the recipient.

A typical routine with a courier agency differs from the above in that couriers usually visit both the sender, upon his order, to pick up the parcel, and the recipient, to deliver the parcel. A typical routine with a commodity bought on-line may differ in that the sender, being also a trade company, may prepare parcels and recipients' data at its own premises or run a courier service of its own.

Notably, the acts of submitting and delivering a parcel in known delivery systems take place in the working hours of post offices or courier agencies and are performed by their human personnel. With the electronic commerce via Internet becoming more and more popular, the flow of parcels to individual recipients snowballs, since an ever increasing proportion of purchasing is now being made online. The flood of parcels challenges the existing systems of delivery to individual customers, also called Last Mile systems.

There are recent attempts to tap the flow of parcels in a system of delivery which is closer to the consumer and is more convenient. Thus, zBox company in the USA (http://www.zbox.com) offers a Last Mile solution in the form of a large mailbox (zBox) made of durable plastic at the doorstep of the house. The zBox is a "smart" and secure home delivery box. The zBox is used to receive packages when shopping online or from catalogs, without attending or negotiating a meeting with delivery personnel. Also, packages can be left in the zBox for pick-up when one needs to return or send an item. The zBox is equipped with a 24-hour touch keypad and a proprietary access system that generates a new access code for each package delivery. To access the zBox, a single personal identification number or PIN has to be remembered.

A similar system is the Brivo Smart Delivery system in the USA (http://www.brivo.com). It utilizes the Web and wireless technology to remotely manage shipments. With Brivo, companies, mobile professionals and consumers can receive packages without attendance and waiting. Brivo uses steel cubic delivery boxes, attached to homes, and wired with an Internet connection. The outside of the Brivo Box has a keypad on which delivery personnel can enter a code that opens the box. The box can then notify the owner through voicemail, email or pager that a package has been received, and store a record of the delivery. The Brivo Box design is based on U.S. Pat. No. 5,774,053. This patent discloses also an embodiment of the invention including a plurality of storage devices grouped in clusters in a common area of a housing subdivision or an apartment complex, similar to the way mailboxes are grouped in some residential areas. The keypad and controller of each of the communication apparatuses attached to such a cluster would be configured to allow access to any predetermined storage device in the cluster and would direct the vendor, homeowner, or apartment dweller to use whichever storage device is currently empty. The communication apparatuses would then notify the homeowner or apartment dweller to which enclosure the delivery was made.

SUMMARY OF THE INVENTION

In the present description and claims, the following terms will be used:

Parcel—an item such as a box, letter, packet, envelope, package, etc., to be delivered from a sender to a recipient. Parcels may have different sizes and weights.

ADM (Automatic Delivery Machine)—an apparatus for final physical delivery of parcels to a recipient and possibly for receiving items from a sender. At least part of ADMs are intended to be located in a plurality of public places.

Public places—places frequently visited by the population such as shopping malls, parking lots in business districts, exit areas from office buildings, commercial chains, public transport stations, gas stations, post offices, university campuses, etc.

LAMIS system—Last Mile delivery system using a network of ADMs.

ADM database—a database with geographical locations of ADMs and their relation to geographical data such as zip codes, cities, streets, etc., or to specific recipients.

LAMIS server—a computer program managing the data related to the delivery of a parcel within the LAMIS system (uses the ADM database).

DAS server (Data Application Server)—a computer program with an e-site interface offering a purchaser a multiple choice of suitable ADMs as a destination for delivery of purchased goods (uses the ADM database).

LAMIS control center—a computerized control center, running a LAMIS server program with the ADM database, and having means for communication with ADMs, and at least some of senders, shippers, dealers, and merchants.

E-site—website, e-commerce site, m-commerce site, cataloger or any other remote site providing a purchaser with an option to buy goods or order items.

Customer—a user of an ADM, may be a recipient or a sender.

Sender—a person or an entity that sends an item to a recipient (a sender may be also a merchant).

Private sender—sender of a parcel through an ADM.

Recipient—a customer of an ADM to whom a parcel is sent, e.g. a purchaser, a private person or a business entity, which picks up a parcel from an ADM.

Merchant—supplier, provider, e-tailer, e-commerce or m-commerce portal, manufacturer, cataloger, etc., sending sold goods or free items to a purchaser.

Shipper—an entity receiving items from a sender and delivering them as parcels to an ADM or to a dealer's warehouse. A postal or courier service may be a shipper.

Dealer—an entity receiving parcels from shippers and delivering them to ADMs. One dealer is associated with a cluster of ADMs. A post office may be a dealer.

Dealer's Warehouse—a computerized store for receiving and sorting parcels before delivering them to ADMs.

Loader—a person employed by a shipper or a dealer to drop-off parcels to and pick-up them from ADMs.

Drop-off—loading of a parcel into an ADM either by a sender or by a loader.

Pick-up—collection of a parcel from an ADM either by a recipient or by a loader.

Purchaser—a person or an entity buying goods or ordering items to be received via an ADM from a merchant.

Vending—sale of goods and also distribution of samples, catalogs and other items from automatic machines.

Access code (AC)—identity number, credit card number or password or any other identification tool that enables the identification of a recipient or a loader and proves his/her authority to access an ADM.

Shipping information (SI)—a collection of data related to a parcel, including a code identifying the parcel, recipient details such as a communication address, and destination details such as a geographical address of a recipient or of a receiving ADM, or of a dealer.

Loading Message (LM)—a message from an ADM to a LAMIS control center notifying that a parcel has been loaded in a specific ADM cell.

Pick-up Message (PM)—a message from an ADM to a LAMIS control center notifying that a parcel has been picked up from a specific ADM cell.

One aspect involves a Last Mile delivery system (LAMIS system) for delivery of parcels to recipients, each parcel being associated with shipping information, including a plurality of Automatic Delivery Machines (ADMs), located in public places and other places convenient for the recipients. Each ADM has a local computer and data and communication network connection, and at least a set of cells, possibly of adjustable size, for storing parcels, and a single access mechanism for each such set, adapted to provide a recipient with access to a parcel stored in a cell while preventing access to parcels in other cells. The system further includes computerized control centers using an ADM database with locations of the ADMs, a LAMIS server computer program for handling the data associated with the operation of the system, which enables a multiple choice of an ADM for the delivery of the parcel by using the ADM database, and which is adapted to receive SI and to associate it with a cell in this or otherwise chosen ADM. The control center has data and communication network connecting the LAMIS server with the local computers of the ADMs. The local computers are adapted to identify the recipient and to provide access to the parcel in the cell of the chosen ADM.

The access mechanism of the ADM may comprise a number of movable shutters forming a door opening before a predetermined cell. Alternatively, the access mechanism may move a parcel from a predetermined cell to a place accessible for the recipient.

Another aspect involves a system for delivery of purchased or ordered items as parcels from merchants to recipients, each parcel being associated with SI, the system including: a plurality of ADMs located in public or other places convenient for the recipients, each ADM having a local computer and data and communication network connection; at least one computerized control center using an ADM database with locations of the ADMs, a DAS server computer program, having an interface at e-sites or other purchase sites and offering a purchaser a multiple choice of a suitable ADM as a destination for delivery and/or pick-up of the items by the recipient, by accessing the ADM database, the location of the chosen ADM being a part of the SI, a LAMIS server computer program for handling data associated with the operation of said system, and adapted to receive SI and to associate it with a cell in the chosen ADM, and data and communication network connecting the LAMIS server, the DAS server, and the local computers of the ADMs. The local computer of the ADM is adapted to identify the recipient and to provide access to the parcel loaded in the chosen ADM.

The above system may be used for early delivery vending of goods or other items from a merchant to potential recipients, wherein a batch of goods or items is delivered to cells of ADMs without addressing a particular recipient. In this case, the purchasers can use the DAS server interface at the e-site of the merchant to choose a suitable ADM for pick-up of said goods or items without having to wait the delivery time.

A further aspect involves an Automatic Delivery Machine, particularly suitable for the delivery systems referred to above, which is in the form of a container comprising at least one set of cells, possibly with adjustable size, each cell having walls and an access opening, and a single door mechanism for each set, comprising a number of movable shutters adapted to form a door opening of variable size and position in front of the access opening of any cell, thereby providing at a given time access to a predetermined cell or group of adjacent cells of the set, while at the same time preventing the access to all other cells. The movable shutters may be flexible, rollable, foldable or the like, enabling movement along straight or curved path. The container may include a positioning mechanism adapted to move the cells relative to the door mechanism. The cells may be grouped in cassettes, adapted to be removed from and replaced in the container, suitable for loading in a warehouse. The ADM is equipped with a local control computer, peripheral devices and communication to a LAMIS control center. It is adapted to identify a person authorized to access one or more cells, and to provide the access.

The LAMIS delivery system provides a solution for the operational problem of shipping parcels to and from residential and business areas in a manner convenient for consumers. This delivery system allows lowering shipping costs, to shorten the delivery time of goods especially when purchased online, and to simplify picking-up the goods. The Automatic Delivery Machines of the system may be installed at sites inside and adjacent to residential areas and business districts, or at any other public places and to be preferably available and accessible to the public 24 hours a day, 365 days a year. The flexibility and the efficiency of the delivery system is ensured by two novel mechanisms: the multiple choice of a destination ADM through the DAS and LAMIS servers, and the adjustable size cells in the single-door ADMs. The delivery system of the present invention may provide a comprehensive network of convenient and universally accessible points for receiving and sending parcels.

BRIEF DESCRIPTION OF THE SEVERAL VIEWS OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE INVENTION

Figure 1:
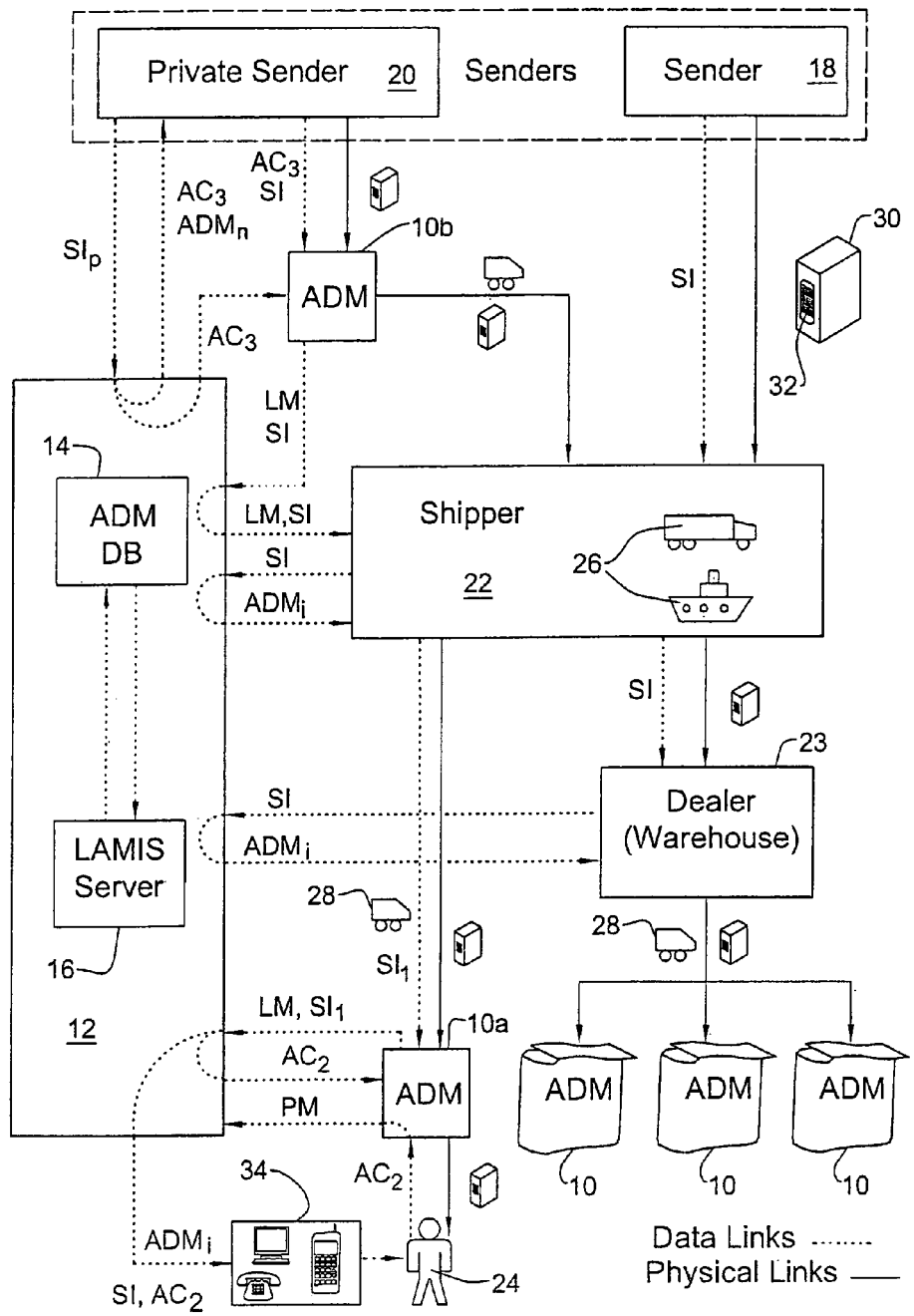
FIG. 1 is a block diagram illustrating the operation of a LAMIS delivery system in accordance with one aspect of the present invention.

With reference to the block diagram shown in FIG. 1, the main components of a LAMIS delivery system according to one embodiment of the present invention are:

(a) plurality of ADMs 10 (described in detail below), each ADM having a plurality of cells storage with adjustable size, a mechanism for providing the customer with access to parcels from one storage cell at a time, a local computer, customer interface (peripheral devices) and communication devices; and (b) LAMIS control center 12, comprising
data processing and other resources, an ADM database 14,
means of communication with ADMs,
control software LAMIS server 16 for managing the ADM database and the system operation, enabling a multiple choice of an ADM as a delivery destination.

The LAMIS delivery system is adapted to interact with at least some of senders 18, private senders 20, shippers 22, dealers 23, and with recipients 24 using public data communication channels such as the Web, cellular phones, pagers, etc. Shippers 22 have means of transport 26, loaders 28 for loading of parcels into ADMs, and authorization to access the ADMs. Existing Post offices, for example, may be senders or shippers and/or dealers using the LAMIS system.

For the efficient and convenient functioning of the LAMIS delivery system according to the present invention, the ADMs should be deployed so as to ensure that most customers have an ADM in proximity to their home or place of work or business or on their way thereto, in public places such as parking lots in business districts, exit areas from office buildings, commercial chains (McDonald's, 7-Eleven), shopping malls, public transport stations, gas stations, post offices, etc.

The operation of the delivery system of the present invention is as follows:

A sender 18 prepares a parcel 30 for sending by attaching to it shipping information (SI), for example on a bar-code label 32. The shipping information includes description of the parcel (parcel identification code), recipient details such a communication address, and destination details such as a geographical address of a recipient or of a receiving ADM, or of a dealer. The sender may be offered to choose an ADM out of a group of suitable ADMs as a delivery destination (the multiple choice process is described in detail below). Items of non-rectangular, non-stable shape or of very small size may be packed in boxes adapted to carry the label.

When the shipper 22 receives the parcel and the SI, the shipper may transmit the SI to the LAMIS control center 12 and, if necessary, may receive information ($ADM.sub.I$) about the location of a suitable ADM 10a and an available cell. If an ADM is not chosen by the sender, a suitable ADM may be chosen by the shipper through a multiple-choice selection among a few destination ADMs. Then the shipper 22 transports the parcel 30, and its loader 28 loads it into an ADM cell. The loader inputs the parcel identification code in the ADM local computer, e.g. via a bar-code reader, for recognition of the parcel. If the ADM cannot recognize the parcel, the loader may create a new record for the parcel in the system and enter shipping information $SI.sub.1$ into the local ADM computer. The loader may adjust the cell of the ADM to the parcel size. A batch of parcels may be loaded into an ADM in a cassette carrying the SI in an attached memory module (explained in detail below).

The local computer of the ADM 10a informs the LAMIS control center 12 about the loading and the cell status by sending a loading message LM. The control center assigns an access code $AC.sub.2$ to the cell, for example PIN code number, and sends it to the ADM. The recipient 24 is notified by a delivery message containing the at least part of the shipping information SI and the access code $AC.sub.2$. The message is preferably sent through the communication means 34 of the recipient, for example by e-mail, pager message, phone call, as specified in the communication address supplied by the sender. In some cases, the notification may be done by non-electronic means, i.e., by dropping a note in a mailbox.

The recipient 24 approaches the ADM at any convenient time and enters the access code $AC.sub.2$ through the ADM interface (card reader, touch screen, keyboard, cellular identification voice recognition, etc.). Upon successful identification, the ADM provides access to the parcel from the respective cell and the recipient picks up the parcel. The local computer of the ADM informs the LAMIS control center about the pick-up by a pick-up message PM.

The LAMIS delivery system also allows a sender 20 (designated as private sender in FIG. 1) to pass a parcel 30 to the shipper 22 by means of an ADM. In this case, the private sender 20 communicates with the control center 12 of the system, submits preliminary shipping information $SI.sub.p$ (lacking parcel identification code) and receives an access code $AC.sub.3$ and the location $ADM.sub.N$ of a suitable ADM 10b with a free cell of suitable size. The sender may be offered a multiple choice of suitable ADMs both for receipt of the parcel and for a final destination. The access code is downloaded also to the ADM 10b. Then the sender approaches the ADM and identifies himself by entering the access code $AC.sub.3$. The ADM provides the sender with access to the free cell and the sender drops off the parcel 30. The shipping information SI is read by a bar-code reader installed in the ADM, if prepared earlier by the sender, or may be entered through the ADM interface. The above process of sending a parcel may also be performed at the spot by means of the local computer of the ADM. If the ADM approached by a sender has no suitable cell for the parcel, the ADM may offer the sender multiple choice of other receiving ADMs, using the connection to the LAMIS control center.

The local computer of the ADM 10b notifies the control center 12 about the drop-off by a loading message (LM) and also transmits the shipping information SI. The control center notifies the shipper 22 (LM, SI), and the latter picks up the parcel by its loaders 28.

The same procedure of dropping-off parcels may be used for returning bought goods. For this purpose the goods, when originally sold, may bear thereon at least part of the shipping information SI.

This procedure is also suitable for the replacement of items such as cellular phones. In this case the shipping information may be stored in the LAMIS server as provided beforehand by a replacing company, and the item user may be provided with access code is by the replacing company.

As shown at the right side of FIG. 1, the delivery service may also be handled by a local dealer 23 receiving parcels from a shipper 22, having a warehouse and loaders 28, and operating a cluster of ADMs. In such case, the shipper 22 ships the parcel 30 and submits the SI to the local dealer 23, which communicates with the LAMIS control center 12 and loads the parcel in an ADM cell as explained above for the shipper.

The LAMIS server software is an important element of the delivery system management and will be described here in more detail. The tasks of the LAMIS server are:

- to download data regarding shipments and parcels (SI), consumers, shippers, servicing personnel (i.e. access codes) into specific ADM;
- to provide multiple choice of a suitable ADM for parcel delivery or receipt using the ADM database and recipient or sender details;
- to enable back-office employees or technicians of the shipper/dealer to remotely acquire data from each ADM;
- to facilitate diagnostics, troubleshooting and repair;
- to enable customer support personnel to assist customers;
- to ensure interface to other information technology of the shipper/dealer.

For example, the LAMIS server is able to give the following information:

- list of all parcels that currently stay in a given ADM;
- list of all parcels that are currently on their way to a given ADM;
- monitor all events that occur in an ADM, such as Error, Warning, Notification, OK;
- handling history of a given event;
- list of ADMs in a geographic area;
- list of loaders authorized to load parcels into a given ADM;
- list of technicians authorized to work on a given ADM;
- for each shipment retrieve the loader details.
- statistics on timing, i.e. for how long a parcel stays in the ADM from the time a loader loaded it to the time the recipient picked it up;
- statistics on how long it takes a given loader to load a parcel to an ADM;
- history of all shipments that a user have received via the LAMIS delivery system;
- list of all parcels that have crossed the LAMIS system in a given time, broken by ADM or by groups of ADMs.
- statistics on how many parcels have passed via the LAMIS system, broken by shippers or by merchants.
- statistics on the time that it takes between the moment a sender ordered a shipment and its arrival to the final destination.

A very important function of the LAMIS server 16 within the framework of the LAMIS delivery system is to provide a multiple choice of suitable ADMs for internal users and for customers using DAS. For this purpose, the ADM location database 14 is maintained. It contains geographical locations of ADMs related to the geographical framework of the area associated with each ADM. The database establishes connections between regions, countries, districts, cities, towns, quarters, streets, ranges of street numbers, zip codes, map coordinates, famous town spots and buildings, etc. with the location of nearby ADMs. The database may also establish connection between particular users and their preferred ADMs. The database may also maintain various criteria of proximity used to build a prioritized list of ADMs suitable for a user with given location, means of transport, and preferred time window. For example, suitable ADMs for a user with a certain location, walking on foot in the evening may not be the same as suitable ADMs for a user with the same location but driving a car in the morning. The LAMIS server is adapted to make a query in the ADM database based on the above data and criteria, adding other criteria such as the current or projected status of ADMs, to obtain a result, and to present it as a ranked list of ADM locations, thereby offering he user a multiple choice of a preferred ADM among suitable ADMs.

Figure 2:
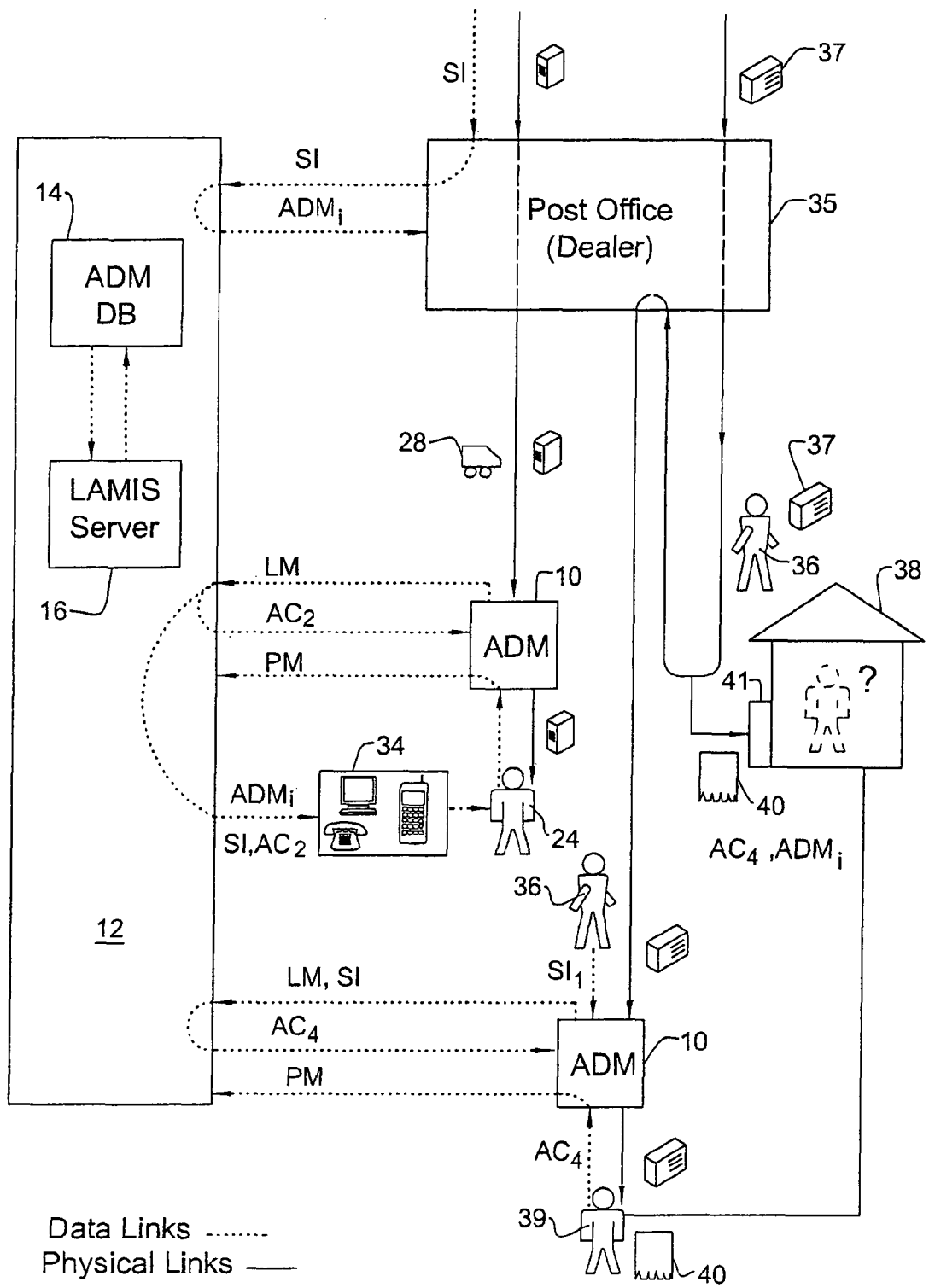
FIG. 2 is a block diagram illustrating the operation of the LAMIS delivery system of FIG. 1 as used in postal services, in accordance with a particular embodiment of the present invention.

According to another embodiment of the present invention shown schematically in FIG. 2, the LAMIS system of delivery may be beneficially used in the postal service. A Post office 36 handles a cluster of ADMs 10 located in a serviced area (a residential complex, a city quarter, etc.). Some of ADMs may be disposed in the premises of the Post office but are accessible round the clock. In this case, the Post office 35 plays the role of the dealer 23 in FIG. 1 and acts as described above for the dealer 23 and the shipper 22. However, the LAMIS system presents additional convenient options to the recipients and the Post office personnel. As of today, a postman 36 attempts to deliver a parcel 37 to the home 38 of a recipient 39. Most often, during the working hours, the recipient is not at home, and the postman leaves a message inviting the recipient to the Post office, again during the working hours. With the LAMIS system, the postman may prepare an access code $AC_4$ and may book a suitable cell or just choose a suitable ADM by the multiple-choice mechanism. Having failed to find the recipient at home, the postman leaves a note 40 in the home mailbox 41 of the recipient, advising the latter of the access code $AC_4$ and the ADM location $ADM_I$. Then the postman enters shipping information $SI_1$ and loads the parcel 37 in the chosen ADM. The local computer of the ADM sends a loading message LM to the LAMIS control center 12 and receives the access code $AC_4$. If the LAMIS system has data regarding communication means of the recipient, it may notify the recipient using said communication means, i.e. by e-mail. Now the recipient 39 may approach the ADM at any convenient time and pick up the parcel as described above.

Figure 3:
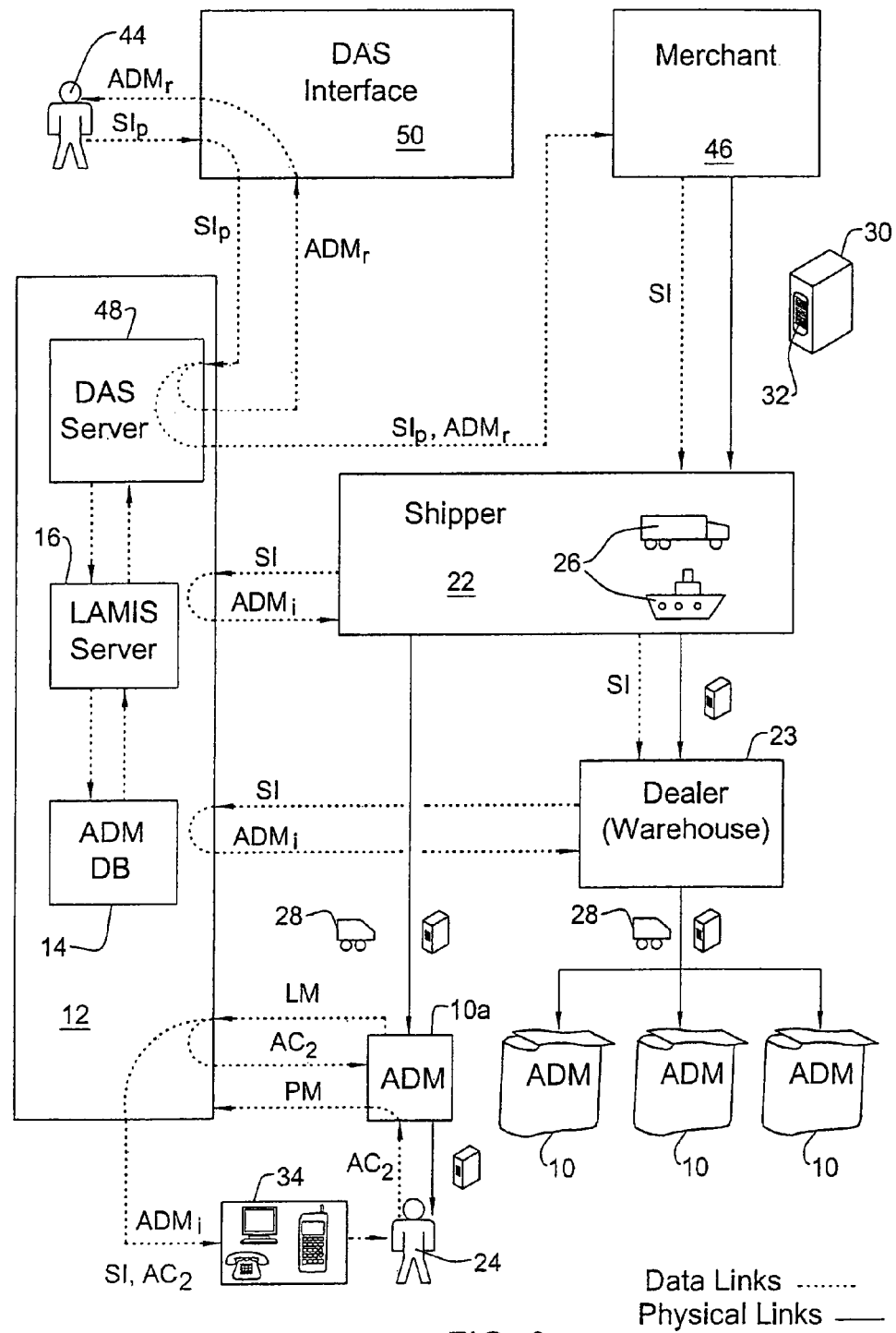
FIG. 3 is a block diagram illustrating the operation of a LAMIS delivery system used in e-commerce, in accordance with another aspect of the present invention.

According to still another aspect of the present invention shown schematically in FIG. 3, a system for delivery of purchased goods especially suitable for e-commerce and m-commerce may be established on the basis of the LAMIS delivery system. In this case, the LAMIS system interfaces with purchasers 44 and recipients 24 who most often, though not necessarily, are the same person, and with merchants 46 having e-sites.

According to this aspect, the e-commerce or m-commerce delivery system has in addition to the plurality of ADMs 10 and control centers 12 described above as components (a) and (b), a component (c) which is a DAS server 48 having interface 50 to merchants' e-sites, and communication with the LAMIS server 16.

The DAS server may run in a LAMIS control center 12. It has a connection to the LAMIS server and is thereby able to make queries to the ADM database 14 and to relate ADM locations to geographical data such as zip codes, cities, street addresses, etc., and to specific recipients. The DAS server helps a purchaser to choose an ADM as a final destination for a purchased goods by offering a multiple choice of suitable ADMs, and transfers shipping information to the LAMIS server. The DAS server may also keep a database with details of consumers who purchase items at e-sites.

The operation of the e-m-commerce delivery system of the present invention is essentially similar to the LAMIS delivery system, wherein a merchant 46 appears as a sender. The difference is in the generation and flow of shipping information (SI), as shown in FIG. 2. The purchaser 44 buying goods from the merchant 46 meets the DAS server interface 50 and chooses an ADM as recipient geographical destination ADM.sub.R. The purchaser also supplies a communication address of the recipient such as e-mail, pager number, phone number, etc. The DAS Server transmits the data as preliminary shipping information SI.sub.p to the merchant 46. The merchant receives other purchase information from its e-site, and uses both for preparation of SI before passing parcels with purchased goods to a shipper 22.

According to still another embodiment of the present invention, the LAMIS delivery system may be used as an early delivery vending system especially suitable for selling fashionable or seasonal goods such as best-selling books, CDs, cassettes, toys, accessories, or for promotional purposes. According to this embodiment, a batch of goods from a merchant is loaded in the cells of an ADM without addressing any particular recipient. Then an advertisement is made about the new goods in the e-site of the merchant or otherwise, and the potential customer is encouraged to book and buy and/or collect the new goods from a near-by ADM without any delay for delivery. Using the DAS server interface and the multiple choice mechanism, the customer chooses a suitable ADM having the advertised goods, and the LAMIS server assigns a cell with the goods to this particular customer or to a recipient of customer's choice.

It is understood that the non-addressed goods may be advertised and sold, as by a common vending machine, to any customer approaching the ADM, if the latter is equipped with means for payment, such as credit card reader and/or interface with banking systems. After such a purchase, the ADM issues a pick-up message and the LAMIS server updates its database. It is also understood that the same procedure may be used for distributing items among recipients without payment but with some kind of registration, for example distributing of hired textbooks among students in a campus, in a school, etc.

Another aspect of the present invention is the Automated Delivery Machine (ADM), which is the basic automated unit of the LAMIS delivery system interfacing with the customer. One embodiment of the ADM will be described here in more detail with reference to FIGS. 4, 5, 6, 7 and 8.

Figure 4:
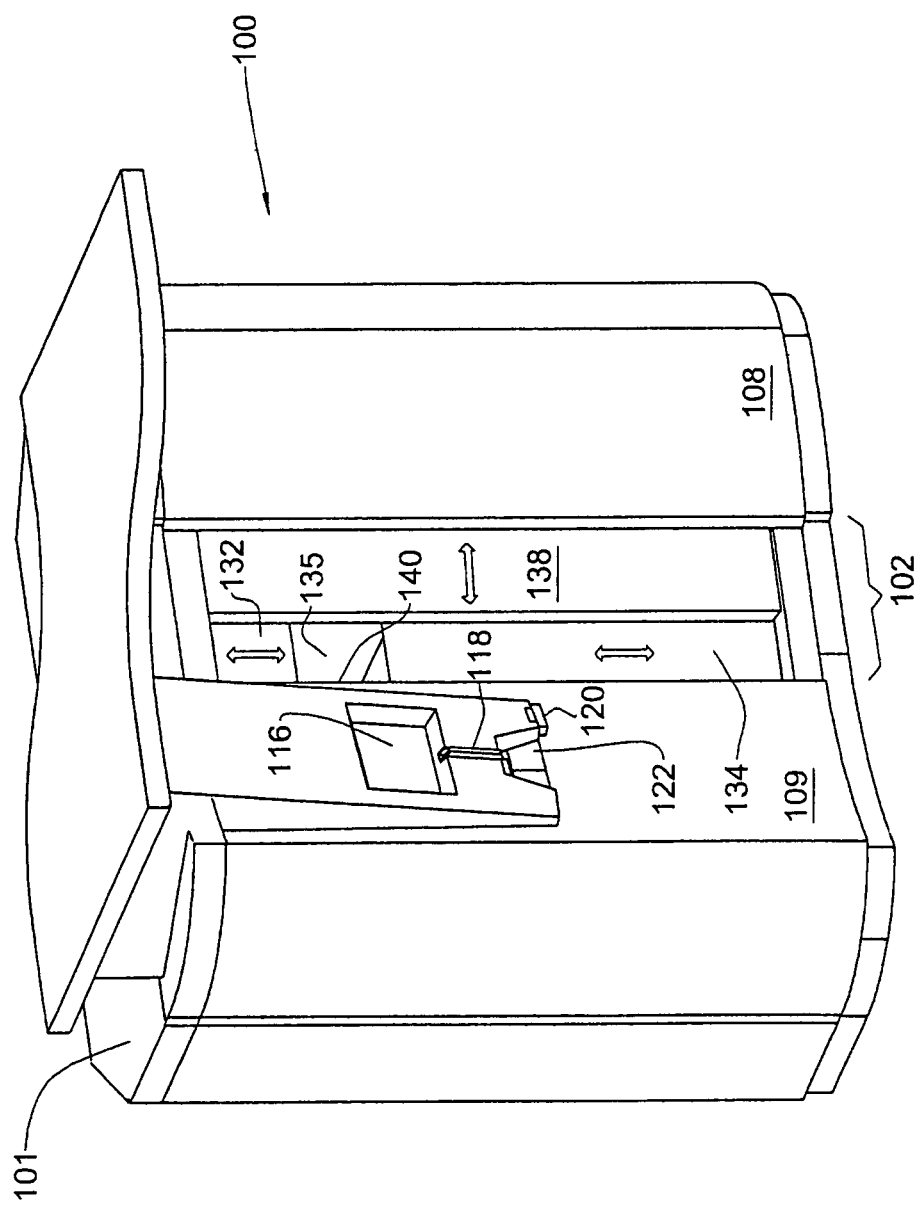
FIG. 4 is a general perspective view of an ADM, in accordance with one embodiment of the present invention.
Figure 5:
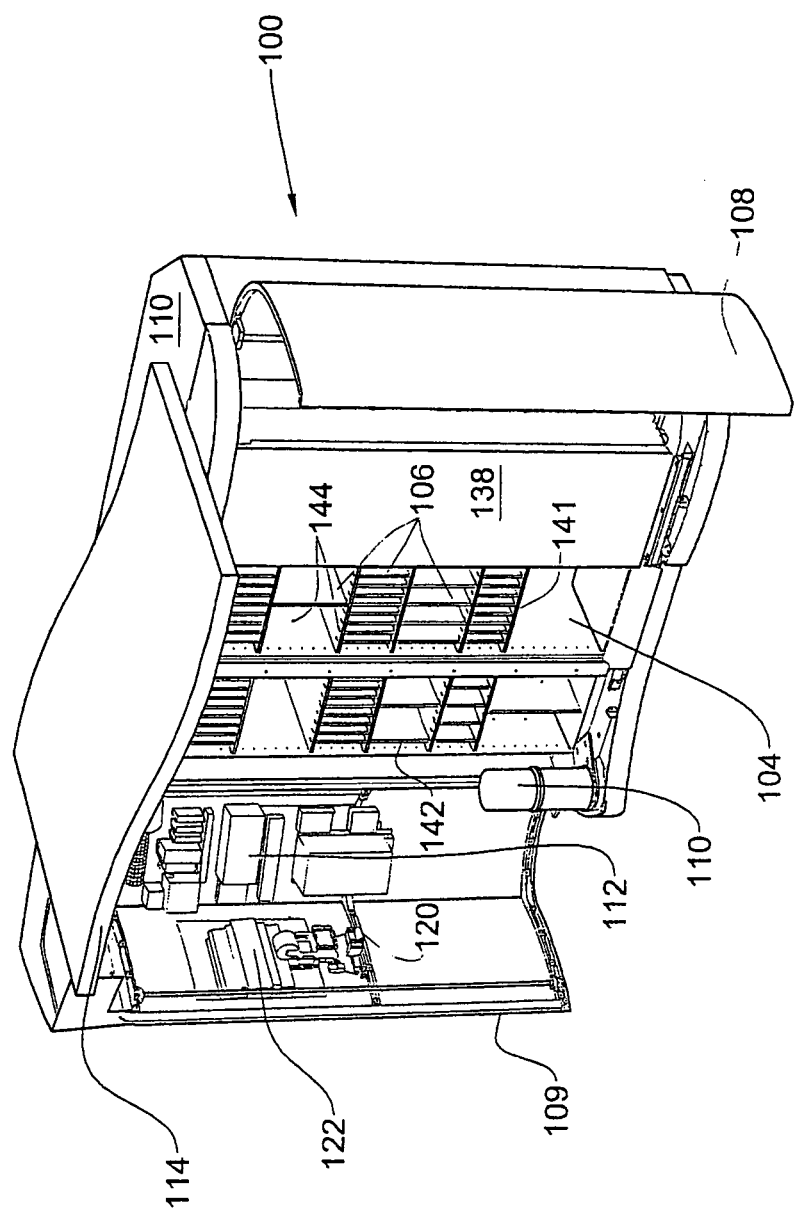
FIG. 5 is a view of the internal arrangement of the ADM shown in FIG. 4.

With reference to FIGS. 4 and 5, an ADM 100 is a robust container, comprising a cabinet 101 with a customer door assembly 102, movable carriages 104 with storage cells 106, service doors 108 and 109, and a positioning mechanism 110. Each ADM has a computerized control unit 112, a communication unit 114, and input-output periphery devices including a touch screen 116, a magnetic card reader 118, a bar-code reader 120, and a printer 122. ADMs are connected to electric power mains and communication lines.

The customer door 102 assembly preferably comprises an upper shutter 132, a lower shutter 134, and a sliding door 138. The upper and lower shutters may be flexible, rollable or foldable and may move along a curved path. The shutters 132 and 134 have computer-controlled drives allowing them to define an opening 135 at any vertical position and size within the overall dimensions of the customer door assembly. The sliding door 138 provides for the adjustable width of the opening which has one of its vertical edges 140 fixed. The positioning mechanism 110 however may change the horizontal position of the carriage 104 relative to the door opening. Thus, the cooperative work of the shutters 132 and 134, the sliding door 138, and the positioning mechanism 110 provides for an opening matching any predetermined cell 106 or group of cells in the carriage 104, preventing the access to any other cell.

It is understood that the same effect may be achieved using two horizontally sliding doors instead of one sliding door and the positioning mechanism moving the carriage relative to the door. Alternatively, if the positioning mechanism is adapted to adjust both horizontal and vertical position of a carriage or of a cell, then two sliding shutters or doors may be sufficient.

Figure 6:
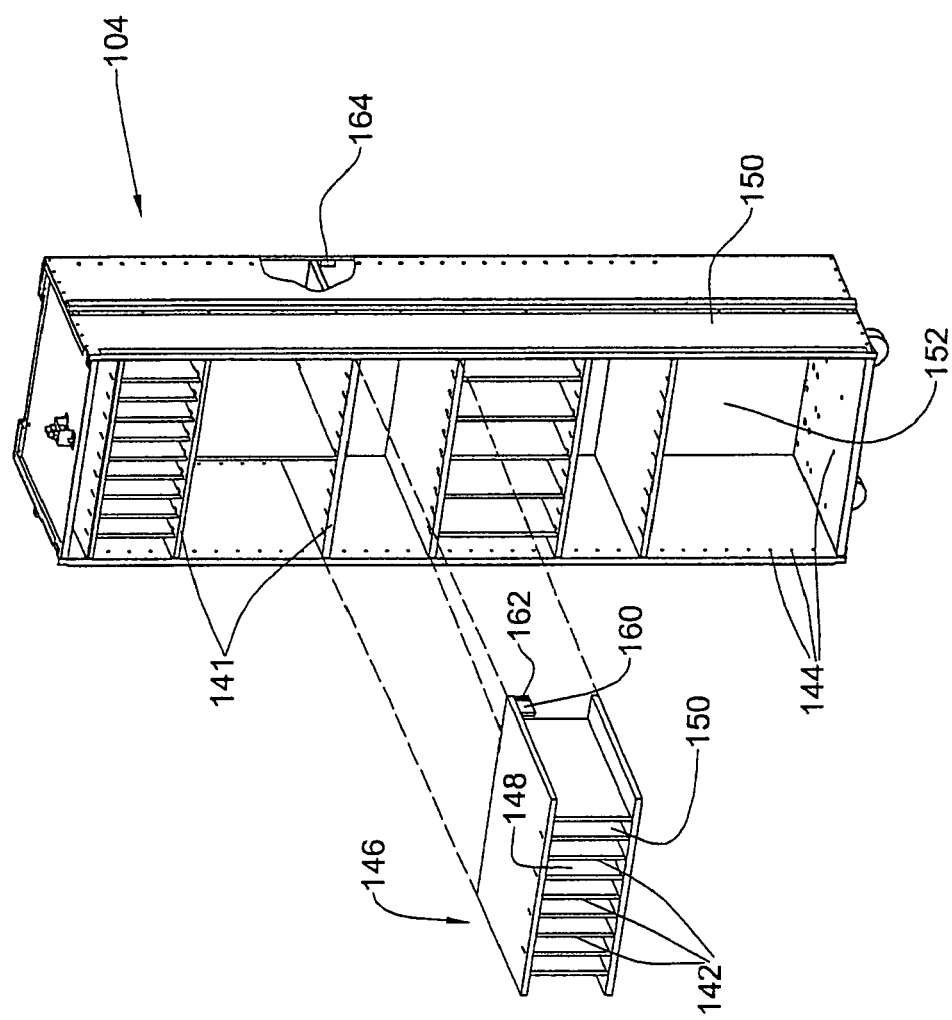
FIG. 6 is a perspective view of a carriage and a cassette of the ADM shown in FIG. 4.

The storage cells 106 are preferably grouped in rows of fixed height and divided by horizontal shelves 141 and vertical walls 142 (see also FIG. 6). Both shelves 141 and walls 142 may be moved and fixed in different positions by fixing elements 144.

This design of the door assembly and the storage cells provides for a very flexible and efficient usage of the storage volume in an ADM. The cells 106 may be not only of different sizes but their size may be adjustable according to the size of the parcels. Preferably, available cell dimensions are standardized in a series of incrementally increasing sizes, both in height and width, as indicated by the positions of fixing elements 144 in FIG. 5. The adjustment is preferably performed by removing and inserting vertical walls 142 which may be done in place by the loaders.

FIG. 6 shows a carriage 104 equipped with cassettes 146 adapted to be loaded/unloaded into the carriage through the service door 108 or through the customer door assembly 102. The cassette 146 is a box made of metal, plastic or other material divided into cells 148, 150 of variable but standardized sizes, suitable to accommodate parcels, one in each cell. The cassette 146 has its vertical front side open, allowing access to cells. The cassette is adapted to be inserted in large cells 152 of the carriage 104 dividing them into smaller ones 148, 150, as needed. Cell sizes within a cassette may be adjusted by replacing the internal walls 142. Cassettes 146 may be the basic shipping units of a highly effective LAMIS system since they may be filled with parcels or goods at a dealer's warehouse and then transported to the ADMs by loaders' delivery vehicles.

Preferably, each cassette has its own programmable memory unit 160 (EPROM, Flash or other power-independent type), adapted to be reprogrammed when inserted in an ADM or at the warehouse, through connectors 162, 164. The memory unit 160 stores data about the configuration of the cassette 146 and shipping information of parcels loaded at the warehouse, dropped-off by a loader or sender, or picked-up by a loader or recipient.

Figure 7:
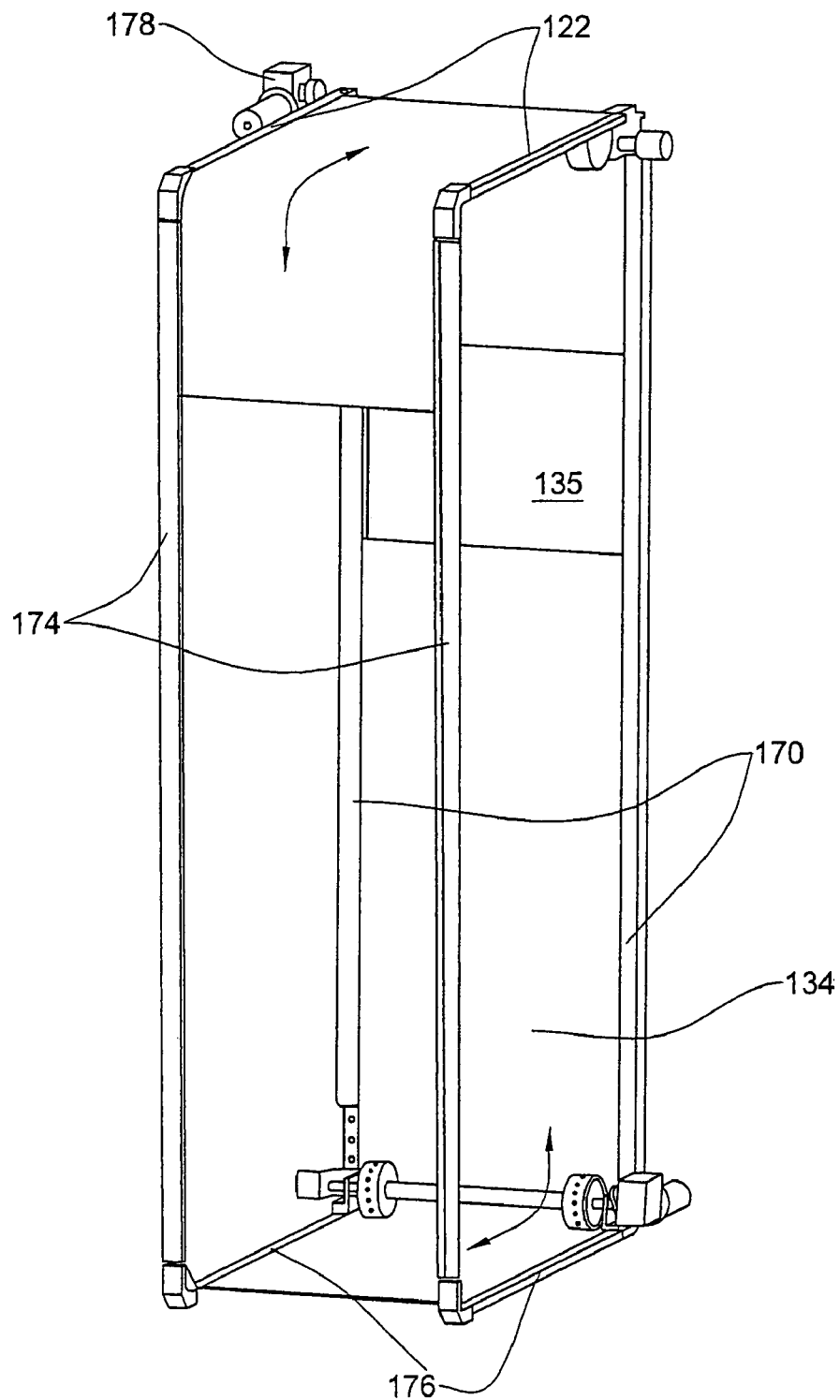
FIG. 7 is a perspective view of a pair of shutters encircling the ADM shown in FIG. 4.

FIG. 7 shows an assembly of upper and lower shutters of flexible type moving along a common path encircling the ADM. The path is defined by pairs of rails 170, 172, 174 and 176. The upper shutter 132 runs along front rails 170, ceiling rails 172 and back rails 174. The lower shutter 134 runs along front tails 170, bottom rails 176 and back rails 174. The shutters have independent drives 178 and 180 adapted to move and fix the shutters in any position along the rails, Is defining thereby an opening 140 of any predetermined vertical dimension and position.

Figure 8:
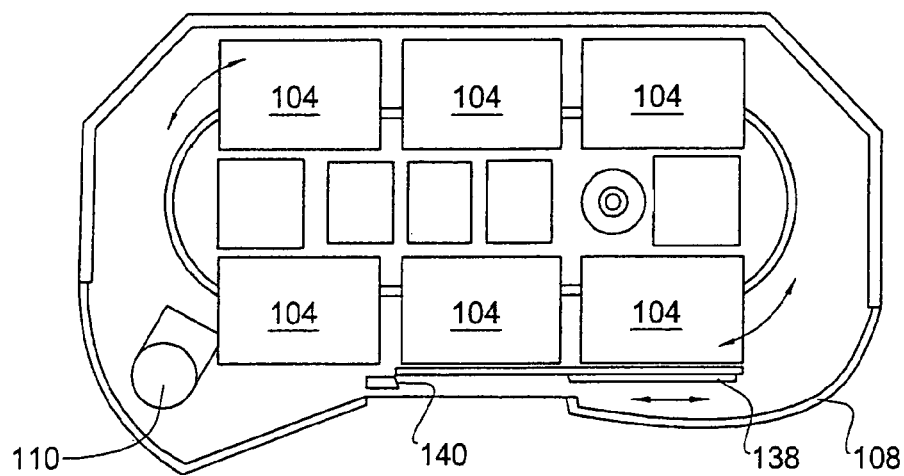
FIG. 8 is a schematic plan of carriage movement in the ADM shown in FIG. 4.

As it is shown in FIG. 8, the ADM may accommodate a plurality of carriages 104. The positioning mechanism 110 is adapted to move the carriages in a cyclic scheme and to align a selected carriage and/or cell with the fixed edge 140 of the customer door 102 or with the service door 108.

The computerized control unit 112 (FIG. 5), is a programmable computer running specialized ADM software, which is adapted to perform the following main functions:

Receiving remote shipping information and access codes from the LAMIS server 18 through the communication unit 114;

Reading shipping information and configuration data from cassette memory unit 160;

Checking the consistency of remote shipping information v/s cassette memory information;

Identification of a customer or loader by means of an access code entered by the touch screen 116, magnetic card reader 118, etc.

Receiving items for sending or return (using the bar-code reader 120),

Controlling the positioning mechanism 110 and the customer door assembly 102;

Generating and sending reports to LAMIS control center;

Updating the shipping information in the cassette memory unit 160 after pick-up or drop-off of an item;

Displaying instructions and suitable help information for the customer.

The computerized control unit may have additional functions such as printing shipping labels, payment operations, selling fashionable products, adds, marketing information, communication with LAMIS control center personnel.

Communication unit 114 provides for all data exchange and network functions of the computerized control unit 112 through phone, cable, optical, wireless or other available channels, preferably using the internet.

Input-output periphery such as the touch screen 116, the magnetic-card reader 118, the bar-code reader 120, the printer 122, is of common type. The printer 122 may be adapted to print bar-code labels.

Figure 9:
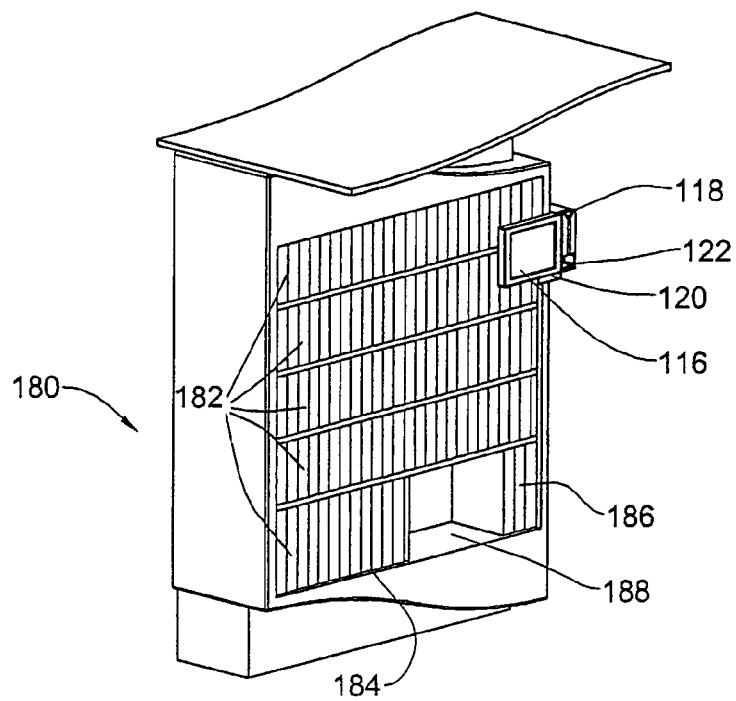
FIG. 9 is a perspective view of a MiniADM in accordance with another embodiment of the present invention.

Another embodiment of an ADM of the present invention is the MiniADM shown in FIG. 9. The MiniADM 180 is of simplified structure, without carriages, having a fixed number of cell rows 182 with fixed height. The width of cells in each row may be adjustable. Each row has its own pair of rollable shutters 184 and 186 providing an opening 188 of variable width along the whole row. The control and communication devices of the MiniADM are similar to those in the above-described ADM. The customer interface devices include a touch screen 116, a magnetic card reader 118, a bar-code reader 120, and a printer 122.

Figure 10:
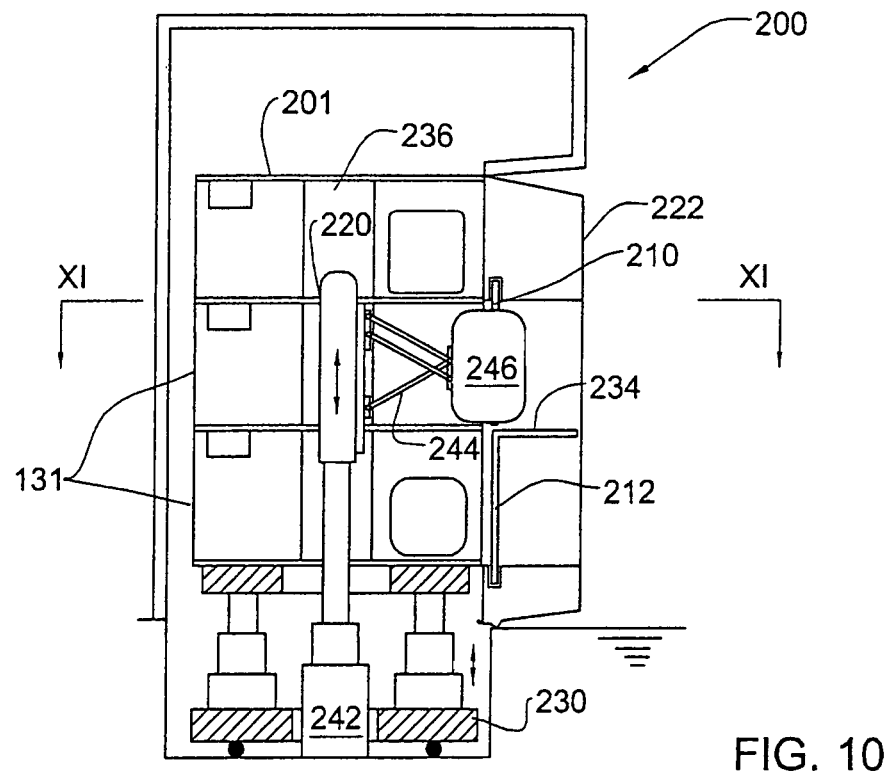
FIG. 10 is a sectional elevation of a rotary ADM in accordance with still another embodiment of the present invention.
Figure 11:
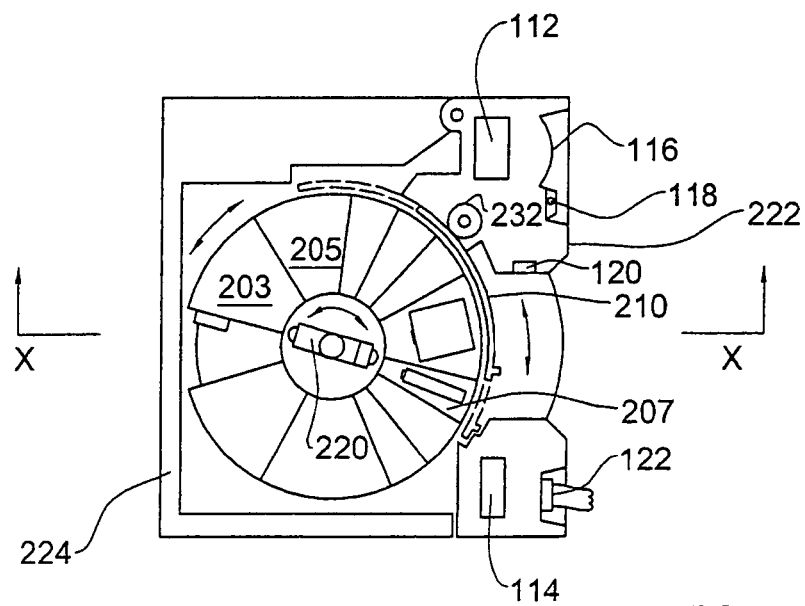
FIG. 11 is a sectional plan of the rotary ADM shown in FIG. 10.

A still further embodiment of an ADM of the present invention, having a rotary structure is disclosed in FIGS. 10 and 11.

With reference to FIGS. 10 and 11, the rotary ADM 200 comprises the following main parts: removable barrel cassettes 201 with storage cells 203, 205, 207 of varying size, two adjacent customer doors 210 and 212 stacked vertically, a pushing device 220, service door 222, positioning mechanism 230, computerized control unit 112, communication unit 114, input-output periphery (touch screen 116, magnetic card reader 118, bar-code reader 120, printer 122).

Customer doors 210 and 212 are adapted to be opened, by a drive 232, exactly to the width of the cell opposite the door, providing access to one cell at a time. If the ADM is loaded with a double-height cassette, and a double-height cell is addressed, the upper and lower doors are opened simultaneously to the same width. The shelf 234 under the upper door 210 is made integral with the upper edge of the lower door 212.

Removable barrel cassettes 201 are of rotary form but have replaceable internal walls and other functional elements similar to rectangular cassettes 146, FIG. 6.

The pushing device 220, is positioned in the central well 236 of the cassette stack, opposite the back of the cell 207 aligned with the customer door 210, but can move vertically and rotate about the axis of the central well by means of computer-controlled drive 242. The pushing device 220 is equipped with a pushing lever or telescope 244 adapted to push a parcel 246 out of a cell onto the shelf 234, with customer door open, facilitating the recipient to collect the parcel.

The service door 222 gives access to the ADM interior for loading/unloading cassettes or individual parcels and for maintenance of ADM systems and devices. It is preferably formed as a part or the whole front panel.

The positioning mechanism 230 of the rotary ADM may be adapted to raise/lower the stack of cassettes, and to rotate the stack about the central axis so as to align a specific cell in a cassette with a customer door.

An ADM may be equipped with a push-down access mechanism. It may be similar to the pushing device 220 of FIGS. 10 and 11 but adapted to push a parcel entirely out of the storage cell. With such design, the access openings of the carriage cells may be protected by a robust wall, which may be a service door of the ADM. This wall may prevent the direct access of a customer to a storage cell and to the parcel therein. In this case, a system of baffles or chutes, or a transporting mechanism disposed between the carriage and the wall may ensure the safe movement of a pushed parcel down to an area accessible for the recipient.

Although a description of specific embodiments has been presented, it is understood that various changes could be made without deviating from the scope of the present invention. For example, the delivery system of the present invention may use ADMs of different designs providing adjustable cells and access to one predetermined parcel among a plurality of parcels. Such ADMs may have devices using pushing, pulling, blowing, suction, vibration, adhesion, inclined planes, etc. for moving the parcels to a place accessible to the recipient. It is further obvious that ADMs of the system may be used as conventional vending automata, disc or videocassette distributor, or may be integrated with other useful devices such as automatic teller machines, ticket selling machine, etc. It is also understood that in a LAMIS delivery system a number of parcels addressed to one recipient can be 15 stored in one cell of the ADM and the LAMIS system control software may be adapted to handle such consolidation of parcels.

What is claimed is:

1. A method of delivering parcels to recipients, each parcel being associated with shipping information, comprising:

disposing a plurality of Automatic Delivery Machines (ADM) in a plurality of predetermined places accessible by the recipients, each ADM having a local computer and data network connection, and a plurality of cells for storing parcels;

at an at least one computerized control center:

providing an ADM database with locations of at least part of said ADMs, providing a last mile delivery system (LAMIS) server computer program for handling data associated with the operation of said system, and receiving, from a postal service, a selection of a particular ADM for delivery of the parcel, said selection of a particular ADM chosen from the at least part of said ADMs with locations in the ADM database by using said ADM database, and connecting said LAMIS server and the local computers of said ADMs via a data network;

inputting the shipping information of said parcel into said LAMIS server, said LAMIS server associating said shipping information with a cell in said particular ADM;

loading said parcel into said cell of the particular ADM;

providing said recipient with an access code and an address for said particular ADM; and the local computer of the particular ADM identifying said recipient by said access code and providing said recipient with access to said parcel from said cell.

2. The method of delivery according to claim 1, wherein said delivery to at least a part of said plurality of ADMs is managed by a dealer, said dealer making a multiple choice selection of an ADM by accessing said LAMIS server.

3. The method of delivery according to claim 2, wherein said dealer is a postal service.

4. The method of delivery according to claim 1, further comprising inputting said shipping information directly to the LAMIS server.

5. The method of delivery according to claim 4, wherein said inputting said shipping information is performed by one of a shipper and a dealer.

6. The method of delivery according to claim 1, further comprising inputting said shipping information into said local computer, and transferring said shipping information to the LAMIS server.

7. The method of delivery according to claim 6, wherein said inputting said shipping information is performed by one of a loader and a sender.

8. The method of delivery according to claim 1, wherein said shipping information includes the location of a chosen ADM, and is generated by a sender, who chooses said ADM.

9. The method of delivery according to claim 1, wherein said shipping information includes the location of a chosen ADM, and is generated by a merchant, with said location of the ADM being chosen by a purchaser when acquiring goods from said merchant.

10. The method of delivery according to claim 1, wherein, for return of purchased or ordered goods to a merchant, said merchant is a recipient and said shipping information is attached to said parcel when originally purchased or ordered.

11. The method of delivery according to claim 1, wherein for replacement of items, the shipping information is stored in the LAMIS server, as provided beforehand by a replacing company, and said access code is provided to a consumer by said company.

12. The method of delivery according to claim 1, further comprising providing a data application server (DAS) program connected to said LAMIS server, and enabling a sender of a parcel to make a multiple choice selection when preparing said shipping information.

13. The method of delivery according to claim 1, wherein said ADM database establishes a connection between a particular user and preferred ADMs of the particular user.

14. The method of delivery according to claim 13, wherein the LAMIS server performs a query in the ADM database based on data regarding the preferred ADMs of the particular user to obtain a result, and to presents the result it as a ranked list of ADM locations, and offers the particular user a multiple choice of a preferred ADM among suitable ADMs.

15. The method of delivery according to claim 1, wherein:
the ADM database maintains criteria of proximity; and
the LAMIS server builds a prioritized list of ADMs suitable for a user with a given location, means of transport and preferred time window.

16. A method of delivering parcels to recipients, each parcel being associated with shipping information, comprising:
disposing a plurality of Automatic Delivery Machines (ADM) in a plurality of predetermined places accessible by the recipients, each ADM having a local computer and data network connection, and a plurality of cells for storing parcels;

at an at least one computerized control center:
providing an ADM database with locations of at least part of said ADMs, said ADM database establishing a connection between a particular user and preferred ADMs of the particular user, the ADM database maintaining criteria of proximity;

providing a last mile delivery system (LAMIS) server computer program for handling data associated with the operation of said system, and receiving, from a postal service, a selection of a particular ADM for delivery of the parcel, said selection of a particular ADM chosen from the at least part of said ADMs with locations in the ADM database by using said ADM database, and connecting said LAMIS server and the local computers of said ADMs via a data network;

inputting the shipping information of said parcel into said LAMIS server, said LAMIS server associating said shipping information with a cell in said particular ADM;

loading said parcel into said cell of the particular ADM;

providing said recipient with an access code and an address for said particular ADM;

the local computer of the particular ADM identifying said recipient by said access code and providing said recipient with access to said parcel from said cell;

the LAMIS server performing a query in the ADM database based on data regarding the preferred ADMs of the particular user to obtain a result, and presenting the result as a ranked list of ADM locations, and offering the particular user a multiple choice of a preferred ADM among suitable ADMs; and the LAMIS server building a prioritized list of ADMs suitable for a user with a given location, means of transport and preferred time window.

\* \* \* \* \*